United States Patent [19]

Migdal et al.

[11] Patent Number: 5,062,980

[45] Date of Patent: Nov. 5, 1991

[54] POLYMERIC STEP LADDER POLYSUCCINIMIDE COMPOSITIONS SUITABLE FOR LUBRICATING OIL DISPERSANTS AND FUEL ADDITIVES

[75] Inventors: Cyril A. Migdal, Croton-On-Hudson; Robert H. Jenkins, Jr., Walden, both of N.Y.

[73] Assignee: Texaco Inc., White Plains, N.Y.

[21] Appl. No.: 428,545

[22] Filed: Oct. 30, 1989

[51] Int. Cl.$^5$ ............... C10M 133/16; C10M 133/58; C10M 149/18
[52] U.S. Cl. ................................ 252/51.5 A; 548/520
[58] Field of Search .................. 548/520; 252/51.5 A

[56] References Cited

U.S. PATENT DOCUMENTS

| | | | |
|---|---|---|---|
| 3,374,174 | 3/1968 | LeSuer | 548/520 |
| 4,663,064 | 5/1987 | Nalesnik et al. | 252/51.5 A |
| 4,973,412 | 11/1990 | Migdal et al. | 252/51.5 A |

*Primary Examiner*—Prince Willis, Jr.
*Assistant Examiner*—Jerry D. Johnson
*Attorney, Agent, or Firm*—Robert A. Kulason; James J. O'Loughlin

[57] ABSTRACT

Polymeric step ladder polysuccinimide compositions prepared by coupling the polyamine segments of polyalkenyl succinimides with dicarboxylic acids are useful as improved lubricating oil dispersants which are more compatible with engine seals made of synthetic rubbers such as Viton ® than existing additives.

16 Claims, No Drawings

POLYMERIC STEP LADDER POLYSUCCINIMIDE COMPOSITIONS SUITABLE FOR LUBRICATING OIL DISPERSANTS AND FUEL ADDITIVES

BACKGROUND OF THE INVENTION

1. Field of the Invention

This invention relates to polymeric compositions suitable for use as dispersants for lubricating oil and/or additives for fuels for internal combustion engines, particularly compositions which are compatible with synthetic rubbers and other polymeric materials utilized in seals and the like within internal combustion engines.

2. Information Disclosure Statement

Internal combustion engines operate under a wide range of temperatures including low temperature stop-and-go service as well as high temperature conditions produced by continuous high speed driving. Stop-and-go driving, particularly during cold, damp weather conditions, leads to the formation of a sludge in the crankcase and in the oil passages of a gasoline or a diesel engine. This sludge seriously limits the ability of the crankcase oil to effectively lubricate the engine. In addition, the sludge with its entrapped water tends to contribute to rust formation in the engine. These problems tend to be aggravated by the manufacturer's lubrication service recommendations which specify extended oil drain intervals.

It is known to employ nitrogen containing dispersants and/or detergents in the formulation of crankcase lubricating oil compositions. Many of the known dispersant/detergent compounds are based on the reaction of an alkenylsuccinic acid or anhydride with an amine or polyamine to produce an alkenylsuccinimide or an alkenylsuccinamic acid as determined by selected conditions of reaction.

It is also known to chlorinate alkenylsuccinic acid or anhydride prior to the reaction with an amine or polyamine in order to produce a reaction product in which a portion of the amine or polyamine is attached directly to the alkenyl radical of the alkenylsuccinic acid or anhydride. The thrust of many of these processes is to produce a product having a relatively high level of nitrogen in order to provide improved dispersancy in a crankcase lubricating oil composition.

U.S. Pat. Nos. 3,172,892 and 4,048,080 disclose alkenylsuccinimides formed from the reaction of an alkenylsuccinic anhydride and an alkylene polyamine and their use as dispersants in a lubricating oil composition.

U.S. Pat. No. 2,568,876 discloses reaction products prepared by reacting a monocarboxylic acid with a polyalkylene polyamine followed by a reaction of the intermediate product with an alkenyl succinic anhydride.

U.S. Pat. No. 3,216,936 discloses a process for preparing an aliphatic amine lubricant additive which involves reacting an alkylene amine, a polymer substituted succinic acid and an aliphatic monocarboxylic acid.

U.S. Pat. No. 3,131,150 discloses lubricating oil compositions containing dispersant-detergent mono- and di-alkylsuccinimides or bis(alkenylsuccinimides).

Netherlands Patent No. 7,509,289 discloses the reaction product of an alkenylsuccinic anhydride and an aminoalcohol, namely a tris(hydroxymethyl)-aminomethane.

U.S. Pat. No. 4,579,674 discloses a hydrocarbyl-substituted succinimide dispersant having a secondary hydroxy-substituted diamine or polyamine segment and a lubricating oil composition containing same.

U.S. Pat. No. 4,338,205 discloses alkenyl succinimide and borated alkenyl succinimide dispersants for a lubricating oil with impaired diesel dispersancy in which the dispersant is treated with an oil-soluble strong acid.

The disclosures of U.S. Pat. No. 3,172,892, U.S. Pat. No. 4,048,080 and of U.S. Pat. No. 4,579,674 are incorporated herein by reference.

U.S. Pat. No. 4,663,064, assigned to Texaco, Inc., discloses dibasic lubricating oil additives which provide improved dispersancy and Viton ® seal compatibility. The additives are prepared by coupling partially glycolated succinimides with organic diacids. European Patent Application No. 87202195.1 discloses polyolefin-substituted succinimides as additives for lubricating oils and fuels. U.S. Pat. No. 4,636,322 discloses lubricating oil compositions having improved dispersancy and Viton ® seal compatibility, the dispersant being prepared by coupling partly glycolated succinimides with an aldehyde and a phenol to form what may be described as a Mannich phenol coupled bis-alkenyl-succinimide.

With the introduction of four cylinder internal combustion engines which must operate at relatively higher engine speeds or RPM's than conventional 6 and 8-cylinder engines in order to produce the required torque output, it has become increasingly difficult to provide a satisfactory dispersant lubricating oil composition.

Another problem facing the lubricant manufacturer is that of sea deterioration in the engine. All internal combustion engines use elastomer seals, such as Viton ® seals, in their assembly. Over time, these seals are susceptible to serious deterioration caused by the lubricating oil composition. A lubricating oil composition that degrades the elastomer seals in an engine is unacceptable to engine manufacturers and has limited value.

An important property of a lubricating oil additive and a blended lubricating oil composition containing such additives is the compatibility of the oil composition with the rubber or elastomer seals employed in the engine. Nitrogen-containing succinimide dispersants employed in crankcase lubricating oil compositions typically have the effect of seriously degrading the rubber seals in internal combustion engines. In particular, such dispersants are known to attack Viton ® AK-6 rubber seals. This deterioration exhibits itself by sharply degrading the flexibility of the seals and increasing their hardness. This is such a critical problem that Volkswagen Corporation requires that all crankcase lubricating oils must pass a Viton ® Seal Compatibility Test before the oil composition will be rated acceptable for engine crankcase service. The polymeric dispersants of the present invention exhibit improved Viton ® Seal compatibility over prior art additives. (Viton ® is the trademark for a series of fluoroelastomers based on copolymers of vinylidene fluoride and hexafluoropropylene, produced by Dupont de Nemours, E. I. & Co of Wilmington, Del.).

It is an object of this invention to provide a novel lubricating oil additive.

Another object is to provide a novel lubricating oil composition which does not degrade elastomer seals in internal combustion engines.

A still further object is to provide a lubricating oil composition which can withstand the stresses imposed by modern internal combustion engines.

Other objects and advantages of the present invention will be apparent to those skilled in the art from perusal of the following disclosure, including the appended claims.

SUMMARY OF THE INVENTION

The present invention provides a novel additive which improves the dispersancy and Viton® Seal compatibility of a lubricating oil. The lubricating oil composition comprises a major portion of a lubricating oil and a minor dispersant amount of a reaction product prepared by the process which comprises steps of:

a) reacting a polyalkyleneamine with an alkenylsuccinic acid anhydride to form a bis-alkenyl succinimide;

b) adding a dicarboxylic acid to this bis-alkenyl succinimide, thereby forming a dicarboxylic acid-crosslinked bis-alkenyl polysuccinimide, denominated a step ladder polysuccinimide because of its structure;

c) acylating the bis-alkenyl polysuccinimide with a carboxylic acid to form a partially acylated bis-alkenyl polysuccinimide; and d) recovering the acylated dicarboxylic acid-crosslinked bis-alkenyl polysuccinimide.

In accordance with the invention, a polymeric step ladder polysuccinimide compound is provided which has the formula:

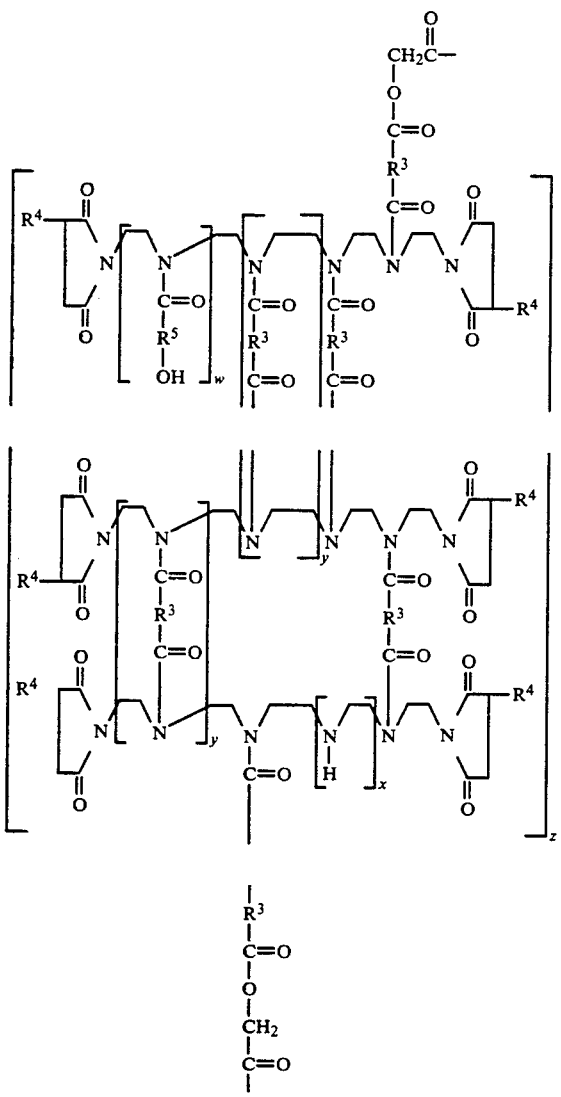

where $R^3$ is a hydrocarbyl group selected from the group consisting of alkyl, aralykyl, cycloalkyl, aryl, alkaryl, alkenyl and alkynyl, having from 2 to about 48 carbon atoms, $R^4$ is a polyalkenyl group such as polyisobutenyl, $R^5$ is an alkyl group having from 1 to about 4 carbon atoms, x ranges from 0 to about 9, y ranges from 0 to about 4, z ranges from 3 to about 1000, and w ranges from 0 to about 4, wherein each polyamine chain contains from 4 to about 14 nitrogen atoms.

The product can alternatively be described as a polymeric step ladder polysuccinimide compound comprising at least three polyalkyleneamine chains, each of these chains being terminated at each end by a polyalkenylsuccinimide, wherein each of the polyalkyleneamine chains is crosslinked to at least one other such chain by dicarboxylic acids which form amides by reaction with the secondary amines of the polyalkyleneamine chains. For the purposes of this application, a step ladder polysuccinimide is a polymeric structure in which at least three alkenyl bis-succinimides are crosslinked through the secondary amine nitrogens of the polyamine chains by dicarboxylic acids, so that each pair of polyamine chains is connected by at least one dicarboxylic acid crosslinking agent. For example, three bis-succinimides prepared from triethylenetetramine can be crosslinked by as few as two dicarboxylic acids, while as many as four dicarboxylic acids could be used to crosslink a set of three bis-succinimides prepared from pentaethylenehexamine.

Although simple bis-succinimide type dispersants have previously been coupled together in pairs using a diacid or a Mannich base reaction (as in U.S. Pat. No. 4,636,322), by extending the simple coupling reaction to form a polymer by bridging the polyamine segments of polyalkenyl succinimides with diacids as shown above, polymeric dispersant compounds and compositions are obtained which unexpectedly produce improved dispersancy without imparting viscosity index (VI) improving characteristics in a single grade oil. Furthermore, the resulting oils exhibit substantially improved compatibility with elastomeric seal compositions such as Viton®.

The dispersants of the present invention are typically employed in lubricating oil compositions comprising major portions of lubricating oils and minor dispersant portions of these dispersant products. The dispersant preferably comprises from about 0.5 to about 11 weight percent of the entire composition, and is preferably from about 2 to about 7 weight percent.

DETAILED DESCRIPTION OF THE INVENTION

The charge polyalkyleneamine compositions which can be employed in practice of the process of this invention according to certain of its aspects can include primary or secondary amines. The amines can typically be characterized by the formula:

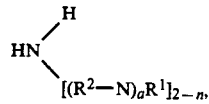

where a is an integer of about 1 to about 6, preferably about 5; and n is an integer of 0 or 1. Preferred amines can include from 4 to about 6 nitrogen atoms.

In the above compound, $R^1$ can be hydrogen or a hydrocarbyl group selected from the group consisting of alkyl, aralkyl, cycloalkyl, aryl, alkaryl, alkenyl, and alkynyl including such radicals when inertly substituted. When $R^1$ is alkyl, it can be methyl, ethyl, n-propyl, iso-propyl, n-butyl, i-butyl, sec-butyl, amyl, octyl, decyl, octadecyl, etc. When $R^1$ is aralkyl, it can be benzyl, betaphenylethyl, etc. When $R^1$ is cycloalkyl, it can be cyclohexyl, cycloheptyl, cyclooctyl, 2-methyl-cyclo-heptyl, 3-butylcyclohexyl, 3-methylcyclohexyl, etc. When $R^1$ is aryl, it can be phenyl, naphthyl, etc. When $R^1$ is alkaryl, it can be tolyl, xylyl, etc. When $R^1$ is alkenyl, it can be vinyl, allyl, 1-butenyl, etc. When $R^1$ is alkynl, it can be ethynyl, propynyl, butynyl, etc. $R^1$ can be inertly substituted i.e. it may bear a non-reactive substituent such as alkyl, aryl, cycloalkyl, ether, halogen, nitro, etc. Typical inert substituent $R^1$ groups include 3-chloropropyl, 2-ethoxyethyl, carboethoxymethyl, 4-methylcyclohexyl, p-chlorophenyl, p-chlorobenzyl, 3-chloro-5-methylphenyl, etc. The preferred $R^1$ groups may be hydrogen or lower alkyl, i.e. $C_1$–$C_{10}$ alkyl, groups including e.g. methyl, ethyl, n-propyl, i-propyl, butyls, amyls, hexyls, octyls, decyls, etc. $R^1$ may preferably be hydrogen.

And, similarly, $R_2$ can be a hydrocarbyl group selected from the same group as $R^1$ subject to the fact that $R^2$ is divalent and contains one less hydrogen. Preferably $R^1$ is hydrogen and $R^2$ is —$CH_2CH_2$—, producing a polyethyleneamine. Typical polyamines which can be employed include those listed below in Table 1.

TABLE 1 diethylenetriamine (DETA)
triethylenetetramine (TETA)
tetraethylenepentamine (TEPA)
pentaethylenehexamine (PEHA)

Preferred amines are tetraethylenepentamine and pentaethylene hexamine.

The charge diacids which may be employed as crosslinking gents in the practice of the present process are characterized by the formula:

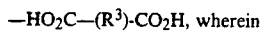

—$HO_2C$—$(R^3)$-$CO_2H$, wherein $R^3$ is a hydrocarbyl group selected from the group consisting of alkyl, aralkyl, cycloalkyl, aryl, alkaryl, alkenyl and alkynyl, having from about 2 to about 48 carbon atoms.

In the practice of the process of this invention, the reagents are stepwise reacted with a succinic acid anhydride bearing a polyolefin substituent containing residual unsaturation in a "one pot reaction".

The succinic acid anhydride may be characterized by the following formula:

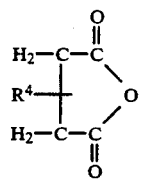

In the above formula $R^4$ may be a residue (containing residual unsaturation) from a polyolefin which was reacted with maleic acid anhydride to form the alkenyl succinic acid anhydride. $R^4$ may have a number average molecular weight Mn ranging from about 500 to about 5000, preferably about 1000 to about 3000, and more preferably from about 1800 to 2500. $R^4$ is preferably a residue of a polyisobutylene (polyisobutene), as this material is generally available and thermally stable in lubricating oil additives.

The diacid crosslinked bis-alkenyl succinimide is prepared by the following sequence of steps in a single flask preparation as shown below. The first step of the reaction sequence involves reacting a polyalkyleneamine such as a polyethyleneamine with an alkenyl succinic acid anhydride (ASAA) in a 1:2 molar ratio to form the bis-alkenyl succinimide (A) intermediate. To this succinimide (A) is added a dicarboxylic acid to form the diacid-crosslinked bis-alkenyl polysuccinimide (B). The mole ratio of the dicarboxylic acid crosslinking agent to the bis-alkenyl succinimide can be in the range of from greater than 0.5:1 to about 3:1, and is preferably in the range of from about 1:1 to about 2:1. To the diacid-crosslinked polysuccinimide is added a fatty acid or a hydroxyaliphatic acid such as glycolic acid to at least partially acylate (glycolate) the remaining free basic amines to form the partially acylated polysuccinimide product (C). The product so obtained may be a 30 to 80, say 50 weight percent solution of the desired additive in an inert diluent, and preferably it is used in this form. The number average molecular weight of the final step ladder polysuccinimide ranges from about 2,000 to about 500,000.

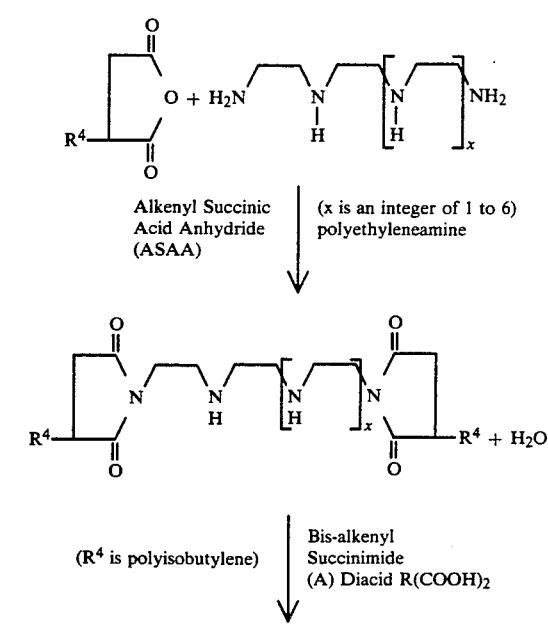

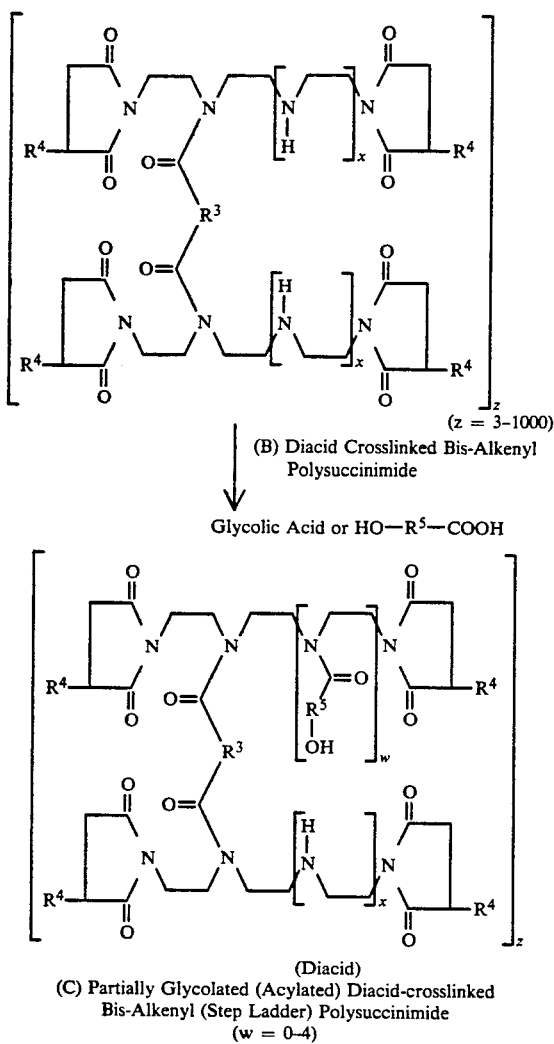

(B) Diacid Crosslinked Bis-Alkenyl Polysuccinimide

Glycolic Acid or HO—R⁵—COOH (Diacid)
(C) Partially Glycolated (Acylated) Diacid-crosslinked Bis-Alkenyl (Step Ladder) Polysuccinimide
(w = 0-4)

The polyisobutenyl succinimide units are crosslinked to produce the polymers of the present invention by reaction with at least one dicarboxylic acid selected from the group represented by the formula:

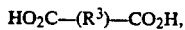

$HO_2C-(R^3)-CO_2H$, as described above. Dicarboxylic acids which are presently preferred based upon their use in examples include adipic (hexanedioic) and dioleic acids.

The coupling or crosslinking reaction can be carried out at temperatures in the range of from about 120° to 180° C., preferably from about 140° to 170° C., and most preferably from about 150° to 170° C. The reaction is carried out until the desired degree of crosslinking is obtained, e.g., with an average of 1, 2 or 3 dicarboxylic acid linkages between each pair of polyamine chains. Reaction times ranging from about 2 to about 6 hours are generally sufficient.

The acylating agent can be a carboxylic acid such as a hydroxyaliphatic acid or a fatty acid. The suitable fatty acids are straight chain compounds, ranging from 3 to 18 carbons. They may be saturated or unsaturated. Saturated acids include lauric, myristic, pentadecanoic, palmitic, margaric and stearic. Unsaturated acids include myristoleic, palmitoleic, oleic, linoleic and linolenic.

The hydroxyaliphatic acid preferably used as an acylating agent is a carboxylic acid characterized by the formula HO—R⁵—COOH, wherein R⁵ is an alkyl group having from 1 to about 4 carbon atoms and the hydroxyl group can be located at any available position therein.

In addition to the fatty and hydroxyaliphatic acids described above, the carboxylic acids used as acylating agents can include aliphatic acids having from 1 (formic) to about 24 carbon atoms, and dicarboxylic acids ranging from oxalic acid to acids of the formula $HO_2C-(R^3)-CO_2H$, wherein R³ is a hydrocarbyl group of the type described above having from 1 to about 22 carbon atoms. Although oxalic acid might be expected to react with any available adjacent secondary amino groups in a "bridging" fashion, few (if any) adjacent pairs of such amino groups will be available after the polyamine chains are crosslinked with the diacid in the previous step.

Preferred acylating agents are glycolic acid, oxalic acid, lactic acid, 2-hydroxymethylpropionic acid, and 2,2-bis(hydroxymethyl)propionic acid, the most preferred being glycolic acid.

It is understood that equivalents of the carboxylic acids prescribed, namely their anhydrides, esters and acyl halides, can also be employed in the practice of this invention. A characteristic of the preferred $C_2$ and $C_3$ hydroxyaliphatic carboxylic acids is their relatively limited or negligible solubility in mineral oil.

Acylation can be effected preferably by addition of the acylating agent (e.g., glycolic acid) to the diacid-crosslinked step ladder polymer product of the polyethyleneamine and the succinic acid anhydride, preferably in an amount of about 0.1 to about 10 equivalents per mole of polyamine chain units in the polysuccinimide. An amount of the acylating agent should be employed which is effective to acylate substantially all (i.e., at least about 90 mole percent) of the active amino sites remaining in the step ladder polysuccinimide.

For example, when triethylenetetramine (TETA) is employed, there are about 0.2 equivalents of glycolic acid added. Similarly, when tetraethylenepentamine (TEPA) is used, about 0.3 equivalent of glycolic acid is added; and when pentaethylenehexamine (PEHA) is employed, about 0.4 equivalents of glycolic acid are added to the reaction.

During acylation, the carboxyl group of the acylating agent bonds to a nitrogen atom to form an amide. Acylation is carried out at 100°-180° C., say 160° C. for 2-24 hours, say 8 hours, preferably in the presence of an excess of inert diluent-solvent.

The partially acylated bis-succinimide monomer unit in one of its embodiments can be represented by the formula:

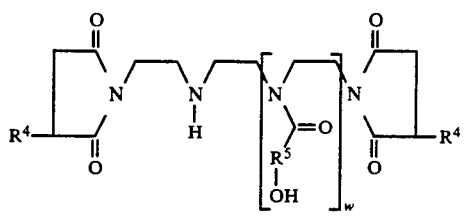

wherein R⁴ is polyisobutylene or the like and w = 1 to 6.

Appropriate reaction conditions for the dicarboxylic acid crosslinking step and the acylation step may vary according to the starting materials and desired properties of the product. While reaction temperatures of approximately 160° C. have been found satisfactory for these steps and the formation of the succinimides, the use of slightly higher temperatures in the crosslinking step will produce materials which are more effective as elastomer-compatible dispersants. To improve or maximize elastomer compatibility, it has been found helpful that the products have a relatively low TBN, but not so low as to reduce the dispersant effect. On the other hand, a relatively high TAN may serve to at least partially counteract the effects of a low TBN on dispersancy. Thus, the TAN value is preferably increased as TBN decreases, and vice versa. The corresponding ranges for values of TAN and TBN, respectively, are preferably about 4 to 9 and about 6 to 10; most preferealby, these values have ranges of about 5 to 8 and about 7 to 9, respectively.

EXAMPLES

The following examples are presented to illustrate specific embodiments of the practice of this invention and should not be interpreted as limitations upon the scope of the invention.

In order to illustrate the effectiveness of the present compounds, i.e., crosslinked glycolated succinimides, as dispersants with Viton ® seal compatibility, there are several tests to which the present succinimides have been subjected. These tests include the Bench VC Test and the Volkswagen Viton ® Compatibility Test. These tests are described below in more detail and the results of the various tests are provided below in Tables I and II.

EXAMPLE I

"Low" Temperature Preparation of Polymeric Step Ladder Polysuccinimides with Adipic and Glycolic Acids A solution of polyisobutenylsuccinic acid anhydride (391.4 g, 0.120 moles, PIBSA prepared from an approximately 2060 molecular weight polyisobutene) in diluent oil (347.6 g) was charged into a two-liter 3-neck flask equipped with a mechanical stirrer, thermometer, thermocouple and nitrogen inlet and heated to 60° C. Next pentaethylenehexamine (17.4 g, 0.066 moles) was added as the crosslinking agent and the heat was increased to 120° C. and maintained for 2.0 hours. Then adipic acid (19.3 g, 0.132 moles) was added and the temperature maintained at 120° C. for 0.5 hours. Next, a 70 percent glycolic acid solution (10.7 g, 0.099 moles) was added and the temperature was increased to 160° C. and maintained for 4 hours to drive off water. The hot mixture (~100° C.) was filtered through diatomaceous earth filter aid. The product (an approximately 50% concentrate) analyzed as follows: Percent N=0.70 (0.72 calc.), Total Acid Number (TAN)=9.5, and Total Base Number (TBN)=10.9. These analyses were carried out by the Kjeldahl nitrogen test, ASTM D2896-85 (TBN) and ASTM D974-85 (TAN).

EXAMPLE II

"Medium" Temperature Preparation of Polymeric Step Ladder Polysuccinimides with Adipic and Glycolic Acids A solution of polyisobutenylsuccinic acid anhydride (391.4 g, 0.120 moles, PIBSA prepared from an approximately 2060 mol. wt. polyisobutene) in diluent oil (347.6 g) was charged into a two-liter 3-neck flask equipped with a mechanical stirrer, thermometer, thermocouple and nitrogen inlet and heated to 60° C. Next pentaethylenehexamine (17.4 g, 0.066 moles) was added and the heat was increased to 160° C. and maintained for 2.0 hours. Then adipic acid (19.3 g, 0.132 moles) was added as the crosslinking agent and the temperature maintained at 160° C. for 2.0 hours. Next, a 70 percent glycolic acid solution (10.7 g, 0.099 moles) was added and the temperature was increased to 160° C. and maintained for 4 hours to drive off water. The hot mixture (~100° C.) was filtered through diatomaceous earth filter aid. The product (an approximately 50% concentrate) analyzed as follows: Percent N =0.70 (0.72 calc.), Total Acid Number (TAN)=7.2, and Total Base Number (TBN) 8.8. Analyses were carried out as in Example I.

EXAMPLE III

"Medium" Temperature Preparation of Polymeric Step Ladder Polysuccinimides with Adipic and Glycolic Acids A solution of polyisobutenylsuccinic acid anhydride (391.4 g, 0.120 moles, PIBSA prepared from an approximately 2060 molecular weight polyisobutene) in diluent oil (3477.7 g) was charged into a 12-liter 3-neck flask equipped with a mechanical stirrer, thermometer, thermocouple and nitrogen inlet and heated to 60° C. Next pentaethylenehexamine (174.2 g, 0.66 moles) was added and the heat was increased to 120° C. and maintained for 2.0 hours. Then adipic acid (19.3 g, 0.132 moles) was added as the crosslinking agent and the temperature maintained at 160° C. for 2.0 hours. Next, 70 percent glycolic acid solution (106.9 g, 0.99 moles) was added at 120° C.; then the temperature was increased to 160° C. and maintained for 4 hours to drive off water. The hot mixture (~100° C.) was filtered through diatomaceous earth filter aid. The product (an approximately 50% concentrate) analyzed as follows: Percent N=0.70 (0.72 calc.), Total Acid Number (TAN)=6.6 and Total Base Number (TBN)=12.1. This TBN was relatively high compared to the products of Examples I and II. Analyses were carried out as in Example I. A MWM-B test carried out as described below resulted in a rating of 53 merits, which is within experimental error of a "pass" rating for a diesel lube oil dispersant (i.e., 55 merits for oil classification "CC"). This demonstrates that the product serves as an effective dispersant in a lube oil subjected to the severe operating conditions in a diesel engine.

EXAMPLE IV

Preparation of Polymeric Step Ladder Polysuccinimides with Adipic and Glycolic Acids A solution of polyisobutenylsuccinic acid anhydride (391.4 g, 0.120 moles, PIBSA prepared from an approximately 2060 molecular weight polyisobutene) in diluent oil (352.1 g) was charged into a 2-liter 3-neck flask equipped with a mechanical stirrer, thermometer, thermocouple and nitrogen inlet and heated to 60° C. Next pentaethylenehexamine (17.4 g, 0.066 moles) was added and the heat was increased to 120° C. and maintained for 2.0 hours. Then adipic acid (28.9 g, 0.198 moles) was added as the crosslinking agent and the temperature maintained at 160° C. for 2.0 hours. Next, 70 percent glycolic acid solution (3.60 g, 0.033 moles) was added at 120° C., then the temperature was increased to 160° C. and maintained for 6 hours to drive off water. The hot mixture (~100° C.) was filtered through diatomaceous earth filter aid. The product (an approximately 50% concentrate) analyzed as follows: Percent N=0.68 (0.71 calc.), Total Acid Number (TAN)=14.6, and Total Base Number (TBN)=8.5. Analyses were carried out as in Example I.

EXAMPLE V

Preparation of Polymeric Step Ladder Polysuccinimides with Dioleic and Glycolic Acids A solution of polyisobutenylsuccinic acid anhydride (782.9 g, 0.240 moles, PIBSA prepared from an approximately 2060 molecular weight polyisobutene) in diluent oil (734.5 g) was charged into a 3-liter 3-neck flask equipped with a mechanical stirrer, thermometer, thermocouple and nitrogen inlet and heated to 60° C. Next pentaethylenehexamine (34.8 g, 0.132 moles) was added and the heat was increased to 120° C. and maintained for 2.0 hours. Then dioleic acid (74.9 g, 0.132 moles) was added as the crosslinking agent and the temperature raised to 160° C. and maintained for 2.0 hours. Next, a 70 percent glycolic acid solution (21.4 g, 0.198 moles) was added at 120° C., then the temperature was increased to 160° C. and maintained for 6 hours to drive off water. The hot mixture (~100° C.) was filtered through diatomaceous earth filter aid. The product (an approximately 50% concentrate) analyzed as follows: Percent N 0.67 (0.68 calc.), Total Acid Number (TAN)=2.6, and Total Base Number (TBN)=7.3. Analyses were carried out as in Example I.

EXAMPLE VI

Preparation of Polymeric Step Ladder Polysuccinimides with Dioleic and Glycolic Acids A solution of polyisobutenylsuccinic acid anhydride (782.9 g, 0.240 moles, PIBSA prepared from an approximately 2060 molecular weight polyisobutene) in diluent oil (802.0 g) was charged into a 3-liter 3-neck flask equipped with a mechanical stirrer, thermometer, thermocouple and nitrogen inlet and heated to 60° C. Next pentaethylenehexamine (34.8 g, 0.132 moles) was added as the crosslinking agent and the heat was increased to 120° C. and maintained for 2.0 hours. Then dioleic acid (149.4 g, 0.264 moles) was added as the cross-linking agent and the temperature raised to 160° C. and maintained for 2.0 hours. Next, a 70 percent glycolic acid solution (21.4 g, 0.198 moles) was added at 120° C., then the temperature was increased to 160° C. and maintained for 6 hours to drive off water. The hot mixture (~100° C.) was filtered through diatomaceous earth filter aid. The product (an approximately 50% concentrate) analyzed as follows: Percent N =0.53 (0.63 calc), Total Acid Number (TAN)=5.8, and Total Base Number (TBN)=6.6. Analyses were carried out as in Example I.

EXAMPLE VII

Preparation of Polymeric Step Ladder Polysuccinimides with Dioleic and Glycolic Acids A solution of polyisobutenylsuccinic acid anhydride (782.9 g, 0.240 moles, PIBSA prepared from an approximately 2060 molecular weight polyisobutene) in diluent oil (796.9 g) was charged into a 3-liter 3-neck flask equipped with a mechanical stirrer, thermometer, thermocouple and nitrogen inlet and heated to 60° C. Next pentaethylenehexamine (34.8 g, 0.132 moles) was added and the heat was increased to 120° C. and maintained for 2.0 hours. Then dioleic acid (149.4 g, 0.264 moles) was added as the crosslinking agent and the temperature raised to 160° C. and maintained for 6.0 hours to drive off water. The hot mixture (~100° C.) was filtered through diatomaceous earth filter aid. The product (an approximately 50% concentrate) analyzed as follows: Percent N=0.64 (0.68 calc.), Total Acid Number (TAN)=5.5, and Total Base Number (TBN)=8.7. Analyses were carried out as in Example I.

EXAMPLE VIII

Preparation of Polymeric Step Ladder Polysuccinimides with Dioleic and Oleic Acids A solution of polyisobutenylsuccinic acid anhydride (3262.0 g. 1.0 moles, PIBSA prepared from an approximately 2060 mol. wt. polyisobutene) in diluent oil (3480.3 g) was charged into a 12-liter 4-neck flask equipped with a mechanical stirrer, thermometer, thermocouple, and nitrogen inlet and heated to 60° C. Next pentaethylenehexamine (145.2 g, 0.55 moles) was added and the heat was increased to 120° C. and maintained for 2.0 hours. Then dioleic acid (308.0 g, 0.55 moles) was added as the crosslinking agent and the temperature was raised to 160° C. and maintained for 2.0 hours. Next oleic acid (467.0 g, 1.65 moles) was added and the temperature maintained at 160° C. and maintained for 2.0 hours. The hot mixture (~100° C.) was filtered through diatomaceous earth filter aid. The product (an approximately 50% concentrate) analyzed as follows: Percent N=0.61 (0.61 calc.), Total Acid Number (TAN)=10.0, and Total Base Number (TBN)=8.3. Analyses were carried out as in Example I.

EXAMPLE IX

The Bench Sludge Test (BVCT)

This test is conducted by heating the test oil mixed with synthetic hydrocarbon blowby and a diluent oil at a fixed temperature for a fixed time period. After heating, the turbidity of the resulting mixture is measured. A low percentage turbidity (0 to 20) is indicative of good dispersants while a high value (30 to 100) is indicative of an oil's increasingly poor dispersancy. The results obtained with the known standards and present dispersants are set forth in Table I below at 4.0 and 6.5 percent by weight dispersant concentration respectively, in a SAE 30W fully formulated motor oil. The formulations with the present dispersants tested on single grade (SAE 30w) oils, unexpectedly indicating that these compounds provide improved dispersancy without imparting viscosity improving characteristics.

TABLE I

| Step Ladder Dispersant EXAMPLES | Bench Sludge Test Results[1] | | | | | | |
|---|---|---|---|---|---|---|---|
| | Conc. of Step Ladder | | SG Quality[2] Dispersant | | Reference Oils[3] | | |
| | 4% | 6.5% | 4% | 6.5% | Good | Fair | Poor |
| 1 | 22 | 13 | 17 | 12 | 20 | 27 | 50 |
| 2 | 37 | 21 | 51 | 20 | 31 | 35 | 68 |
| 3 | 64 | 42 | 67 | 32 | 25 | 26 | 67 |
| 4 | 46 | 32 | 67 | 32 | 25 | 26 | 67 |
| 5 | 46 | 20 | 53 | 18 | 23 | 26 | 71 |
| 6 | 22 | 16 | 25 | 19 | 21 | 25 | 67 |

TABLE I-continued

| | Bench Sludge Test Results[1] | | | | | | |
|---|---|---|---|---|---|---|---|
| Step Ladder Dispersant | Conc. of Step Ladder | | SG Quality[2] Dispersant | | Reference Oils[3] | | |
| | | | | | Good | Fair | Poor |
| EXAMPLES | 4% | 6.5% | 4% | 6.5% | | | |
| 7 | 42 | 23 | 25 | 19 | 21 | 25 | 67 |

[1]All Bench Sludge Test results are the average of duplicate runs (except references). Results are given as percentage turbidity, with experimental error approximately 5‰.
[2]An SG quality dispersant containing partially glycolated succinimides coupled with aldehyde-phenol coupling agents and classified as SG quality.
[3]Reference PV-914 (good), Reference FREO-200 (fair), Reference PV-911 (poor). These oils are referred to in Special Technical Publication (STP) 315-H, Multicylinder Test Sequences for Evaluating Automotive Engine Oils, Part 3: Sequence V-D, published by ASTM (American Society for Testing and Materials), 1916 Race St., Philadelphia, PA 19103.

EXAMPLE X

Viton ® Seal Compatibility

The test described below is designed to test the Viton ® Seal compatibility for a crankcase lubricating oil composition containing a nitrogen-containing dispersant. The Viton ® AK-6 seal is soaked at 150° C. for 96 hours in the oil being tested. The elastomer to oil ratio is 1/80. Then the sample is tested for percent change in elongation, percent change in tensile strength, and the degree of cracking. The dispersant is in the oil formulation at 6 weight percent. The results of tests with a dispersant of the present invention and a control are set forth in Table II.

The Volkswagen Viton ® Compatability Test

An important property of a lubricating oil additive and a blended lubricating oil composition containing additives is the compatibility of the oil composition with the rubber seals employed in the engine. Nitrogen-containing succinimide dispersants employed in crankcase lubricating oil compositions have the effect of seriously degrading the rubber seals in internal combustion engines. In particular, such dispersants are known to attack Viton ® AK-6 rubber seals which are commonly employed in internal combustion engines. This deterioration exhibits itself by sharply degrading the flexibility of the seals and in increasing their hardness. This is such a critical problem that the Volkswagen Corporation requires that all crankcase lubricating oils must pass a Viton ® Seal Compatibility Test before the oil composition will be rated acceptable for engine crankcase service. The AK-6 Bend Test is designed to test the Viton ® seal compatibility for a crankcase lubricating oil composition containing a nitrogen containing dispersant.

The AK-6 Bend Test is conducted by soaking a sample of Viton ® AK-6 rubber at an elevated temperature in the oil being tested, then determining the bending properties and hardness of the Viton ® rubber sample against a suitable sample. Specifically, a 38 by 9.5 mm slab of a Viton ® AK-6 rubber cut with the grain of the rubber is placed in a 30 ml wide-mouth bottle with 20 ml of the test oil. The bottle is sealed and the test sample placed in an oven at 149° C. for 96 hours. The bottle is removed from the oven and the rubber specimen taken from the initial bottle and placed into a second bottle with a new charge of test oil. After 30 minutes in the new oil charge, the rubber specimen is removed from the second bottle and submitted to a Bend Test. This is done by bending the rubber specimen 180°. The degree of cracking is observed and reported as follows: no cracking (NC), surface cracking (SC) or cracking (C). If cracking is observed, the test is terminated on that particular sample.

If no cracking has been observed, the rubber specimen is returned to the bottle containing the second oil charge and this bottle is returned to the oven maintained at 149° C., the bottle is removed from the oven and the rubber specimens withdrawn and placed into another bottle containing a fresh oil charge for 30 minutes, following which the bend test is repeated.

If the rubber specimen continues to pass the bend test, the test is continued for 2 more heat-soak cycles of 96 hours and 72 hours respectively, each heat-soak cycle being followed by the bend test for total test time of 336 hours form the time the specimens were initially put into the oven.

Following the above procedure, each rubber specimen is removed from its bottle, washed in naphtha to remove all oil traces and then air dried. The rubber specimens are then submitted to a hardness test according to the procedure described in ASTM D2240 following which a final bend test is made on all specimens.

TABLE II

| | Viton ® Compatibility Test | | |
|---|---|---|---|
| | Dispersant Example 6 | SG Quality Dispersant[1] | Limits |
| % Change in Tensile Strength | −14.4 | −22.6 | +/− 20 max |
| % Change in Elongation | −9 | −20 | +/− 25 max |
| Crack at 120% Elongation | None | None | None |

[1]See Table I.

These examples indicate that the polysuccinimide dispersants of the present invention cause substantially less loss in tensile strength and substantially less elongation in Viton ® rubber than a commercial dispersant which is acceptable in the automotive industry. To obtain a dispersant which is as effective as the commercial example but substantially more compatible with elastomers such as Viton ® is considered both surprising and unexpected.

Although many specific embodiments of the invention have been described in detail, it should be understood that the invention is to be given the broadest possible interpretation within the terms of the following claims.

What is claimed is:

1. A polymeric step ladder polysuccinimide compound consisting essentially of at least three polyalkyleneamine chains, each of said chains being terminated at each end by a polyalkenyl succinimide, wherein each of said polyalkyleneamine chains is crosslinked to at least one other such chain by dicarboxylic acids which form amides by reaction with the secondary amines of said polyalkyleneamine chains.

2. The polysuccinimide compound of claim 1, wherein said polyalkyleneamine is a polyethyleneamine having a molecular weight in the range of from about 140 to about 270.

3. A polysuccinimide compound in accordance with claim 1 wherein the polyalkenyl portion of said polyalkenylsuccinimide has a molecular weight in the range of from about 500 to about 5000.

4. A polysuccinimide compound in accordance with claim 3, wherein said polyalkenyl portion comprises polyisobutenyl groups.

5. A polysuccinimide compound in accordance with claim 1, wherein the dicarboxylic acids used as cross-linking agents contain from about 2 to about 46 carbon atoms, exclusive of the carboxyl groups thereof.

6. A polymeric step ladder polysuccinimide compound having the formula:

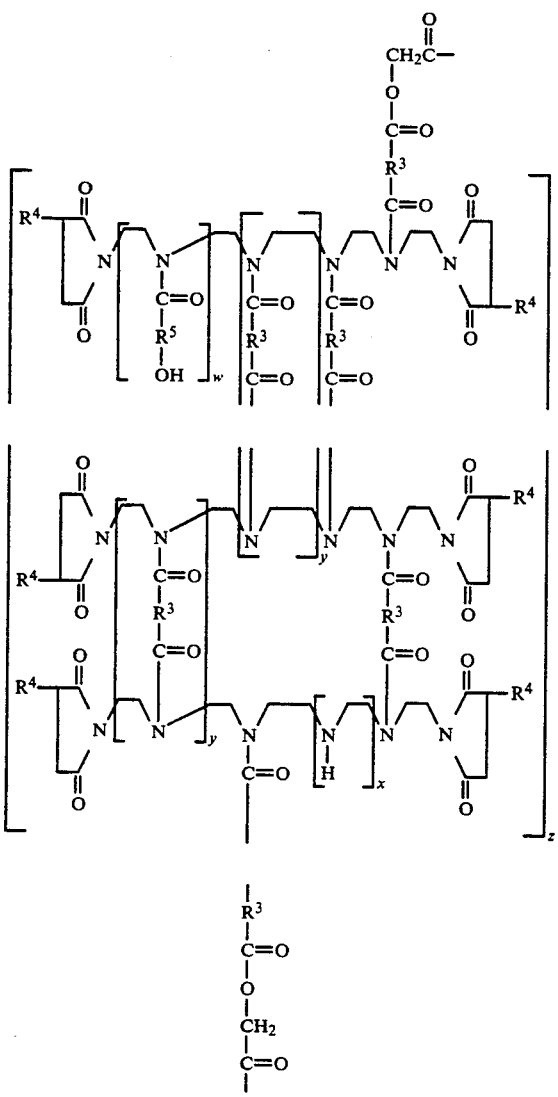

wherein $R^3$ is a hydrocarbyl group having from 2 to about 48 carbon atoms, $R^4$ is a polyalkenyl group, $R^5$ is an alkyl group having from 1 to about 4 carbon atoms, x ranges from 0 to about 9, y ranges from 0 to about 4, z ranges from 3 to about 1000 and w ranges from 0 to about 4, wherein each polyamine chain contains from 4 to about 14 nitrogen atoms.

7. A polysuccinimide compound in accordance with claim 6 wherein $R^4$ is a polyisobutenyl group.

8. A polysuccinimide compound in accordance with claim 6 wherein $R^4$ has a molecular weight in the range of from about 500 to about 5000.

9. A polysuccinimide compound in accordance with claim 6 wherein $R^3$ is an alkyl group having from 2 to about 48 carbon atoms and $R^5$ is an alkyl group having from 1 to about 4 carbon atoms.

10. A polysuccinimide compound in accordance with claim 6, having a molecular weight in the range of from about 2000 to about 500,000.

11. A polysuccinimide compound in accordance with claim 6, wherein $R^5$ contains one carbon atom.

12. A polysuccinimide compound in accordance with claim 6, wherein $R^3$ is a straight chain akyl group containing 34 carbon atoms.

13. A partially glycolated, dicarboxylic acid-crosslinked bis-alkenyl step ladder polysuccinimide compound comprising at least three oplyalkeyleneamine chains, each of said chains being terminated at each end by a polyalkenyl succinimide, wherein each of said polyalkyleneamine chains is crosslinked to at least one other such chain by dicarboxylic acids which form amides by reaction with the secondary amines of said polyalkyleneamine chains prepared by a process comprising the steps of:
a) reacting one mole of a polyethylenehexamine with a polyisobutenyl succinic acid anhydride to form a bis-polyisobutenyl succinimide;
b) reacting said bis-polyisobutenyl succinimide with a stoichiometric excess of least one dicarboxylic acid selected from the group consisting of adipic and dioleic acids under conditions of temperature and time effective to produce a dicarboxylic acid-crosslinked step ladder polysuccinimide;
c) reacting said polysuccinimide with an amount of glycolic acid effective to at least partially acylate said polysuccinimide; and
d) recovering said partially glycolated, dicarboxylic acid-crosslinked bis-alkenyl polysuccinimide as a product.

14. A lubricating oil composition comprising a major portion of a lubricating oil and a minor dispersant amount of the polysuccinimide product of claim 6.

15. A lubricating oil composition comprising a major portion of a lubricating oil and a minor dispersant amount of the polysuccinimide product of claim 13.

16. A lubricating oil composition in accordance with claim 34 wherein said polysuccinimide product comprises an amount in the range of from about 0.5 to about 11 weight percent of said composition.

* * * * *